United States Patent Office 3,808,202
Patented Apr. 30, 1974

3,808,202
METALIZED s-TRIAZINYLOXY- AND AMINO-SALICYLIC ACID BIOCIDES
Albert Frederick Strobel, Delmar, N.Y., assignor to GAF Corporation, New York, N.Y.
No Drawing. Filed Oct. 12, 1971, Ser. No. 188,550
Int. Cl. C07d 55/20, 55/22
U.S. Cl. 260—240 B         16 Claims

ABSTRACT OF THE DISCLOSURE

There are disclosed biocidal compounds of the formula:

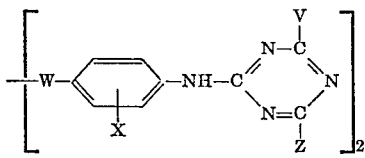

W is a monovalent bond or —CH=CH—; X is hydrogen, COOR, $SO_3R$, COOMe/2 or $SO_3Me/2$;

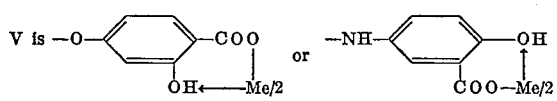

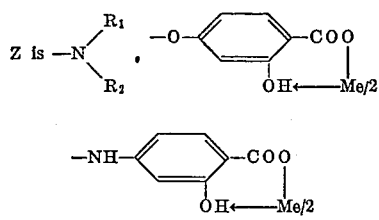

wherein R is an alkali metal such as K or Na: $R_1$ is hydrogen, lower alkyl or hydroxyl lower alkyl; $R_2$ is hydrogen, lower alkyl, hydroxy lower alkyl, alkylene-COOR, alkylene-$SO_3R$, alkylene-COOMe/2 or alkylene-$SO_3Me/2$; Me is a metal such as $Cu^{++}$ or $Zn^{++}$; and at least one of X and Z has a free water solubilizing sulfonic or carboxylic acid group. The compounds are particularly useful as fungicides and bactericides.

BACKGROUND OF THE INVENTION

Field of the invention

This invention relates to biocidal compounds and more particularly to metallized s-triazinyloxy- and amino-salicylic acid compounds which are useful as bactericides and fungicides.

Description of the prior art

Compounds of the type of 2,2'-disulfostilbene-4,4'-bis (amino-s-triazines) wherein the two remaining carbon atoms of the triazine moiety are substituted by oxy and/or amino substituents are well known in the prior art as brightening agents. However, it is believed that the type of compound, wherein one carbon atom of the triazine moiety is substituted by an oxysalicylic acid moiety or a 5-aminosalicylic acid moiety, and is also metallized, represents a new class of compounds which find use as bactericides and fungicides. The present invention provides compounds of this type, their uses as fungicides and bactericides and their methods of preparation.

SUMMARY OF THE INVENTION

It is accordingly one object of the invention to provide novel fungicidal and bactericidal compounds.

A further object of the invention is to provide novel metallized s-triazinyloxy- and amino-salicylic acid compounds which have activity as bactericides and fungicides.

A still further object of this invention is to provide methods for preparation of compounds of this type and methods and compositions for their use as bactericides and fungicides.

Other objects and advantages of the pesent invention will become apparent as the description thereof proceeds.

In satisfaction of the foregoing objects and advantages, there are provided novel biocidal compounds of the following formula:

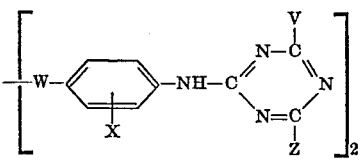

W is a monovalent bond or —CH=CH—; X is hydrogen, —COOR, $SO_3R$, COOMe/2 or $SO_3Me/2$;

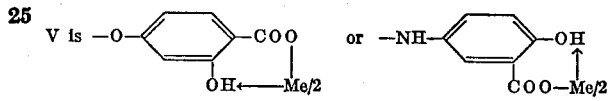

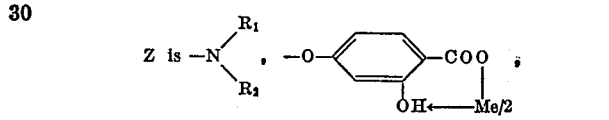

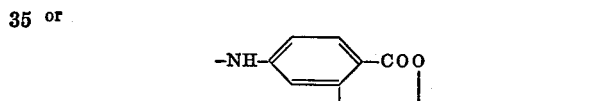

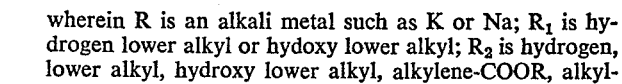

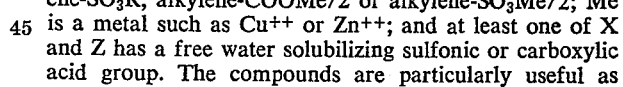

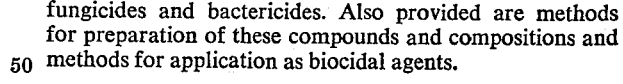

wherein R is an alkali metal such as K or Na; $R_1$ is hydrogen lower alkyl or hydoxy lower alkyl; $R_2$ is hydrogen, lower alkyl, hydroxy lower alkyl, alkylene-COOR, alkylene-$SO_3R$, alkylene-COOMe/2 or alkylene-$SO_3Me/2$; Me is a metal such as $Cu^{++}$ or $Zn^{++}$; and at least one of X and Z has a free water solubilizing sulfonic or carboxylic acid group. The compounds are particularly useful as fungicides and bactericides. Also provided are methods for preparation of these compounds and compositions and methods for application as biocidal agents.

DESCRIPTION OF THE PREFERRED EMBODIMENTS

As pointed out above, the present invention relates to certain novel compounds which have biocidal properties. Thus the metallized compounds of this invention have excellent bactericidal and fungicidal properties with application in a wide variety of areas. In particular, the compounds are water soluble or readily water dispersible and therefore are useful for application in aqueous medium. The products of this invention have the added advantage of being substantive to cellulose fibers such as cotton, paper and viscose rayon, and to nitrogenous materials such as skin and hair. Since they are substantive, and do not wash off readily, they still exhibit bactericidal and fungicidal properties after wetting. In addition, since the unmetallized products are substantive to cellulosic and nitrogenous material, the material which is to be protected can be "dyed" with the unmetallized product followed by metallization in situ. Therefore the products of the invention provide numerous advantages over similar products known to the art.

As pointed out above, the novel compounds of this invention may be characterized by the following general formula:

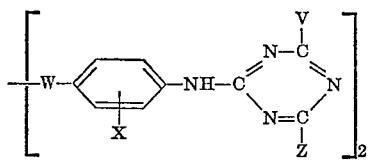

wherein W is a monovalent bond or —CH=CH—; X is hydrogen, —COOR, SO₃R, SO₃Me/2, or COOMe/2;

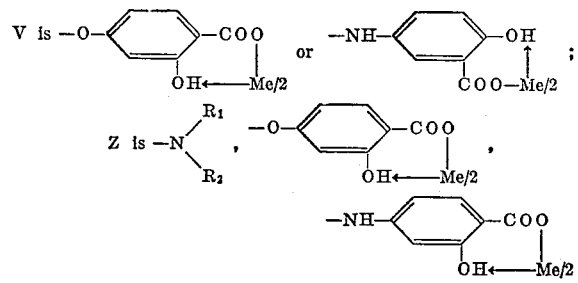

wherein R is an alkali metal such as K or Na; $R_1$ is hydrogen, lower alkyl or hydroxy lower alkyl; $R_2$ is hydrogen, lower alkyl, hydroxy lower alkyl, alkylene-COOR, alkylene-SO₃R, alkylene-COOMe/2, or alkylene-SO₃Me/2, wherein the alkylene chain has 1 to about 6 carbon atoms, Me is a metal such as Cu⁺⁺ or Zn⁺⁺; and at least one of X and Z has a free water solubilizing sulfonic acid or carboxylic acid group. While M is preferably Cu⁺⁺ or Zn⁺⁺, it is to be understood that other metals may be used if compatible with the end use of the products.

In addition, in this formula, in specific embodiments, X and $R_2$ are defined as containing the group COOMe/2 or SO₃Me/2. By this definition is meant that in the carboxy or sulfonic group embodiment the numeral "2" indicates that a complete additional molecule of the compound may be attached through the Me metal, e.g. —SO₃—Me—SO₃—, —COO—Me—OOC—, etc.

The products of this application are effective in the protection of textiles, wood, paper and other cellulosic fibrous materials from the deleterious action of fungi and other cellulose destroying organisms. They may be applied in general for the finishing of textiles to reduce mildew deterioration. They may be applied to the foliage of trees and plants for fungus control, in washing apples and oranges and the like, for the inhibition of pathogen, for treating seeds, for the drenching of flats of seedlings and for the prevention of damp-off.

The preservatives may be modified by the addition thereto of adjuvants, such as wetting agents, water repellants, insect repellants, fire retardants, substances which have a synergistic action, or have a desirable action in further protecting or enhancing the value of the treated article.

The carrier employed is a selective material or materials into which the compounds of this invention are incorporated to produce the fungicidal or bactericidal compositions. Since these compounds are water soluble, water is the preferred carrier, but any carrier, such as a solvent in which the compounds are soluble or dispersible, dust, or other material chosen for a particular intended use of the toxicant incorporated therein, may be employed.

The compounds of this invention are prepared most expediently in the following manner. Thus, one mole of the compound

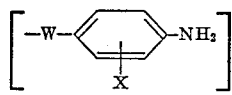

wherein W and X have the meanings given above, is condensed with two moles and up to an excess of about 10% of cyanuric chloride. This type of reaction is well known and is usually carried out in aqueous medium, some water soluble solvent being present if desired and in alkaline medium, i.e. at a pH which ranges from about 8 to 11. A low temperature, about 0–12° C. is usually employed for the condensation. The product may then be isolated, but it is preferable to employ this solution in the next condensation. Suitable organic solvents which may be used include lower alkyl ketones, e.g. acetone, methyl ethyl ketone, and the like. The solution may be made alkaline by addition of a base, e.g. an aqueous solution of Na₂CO₃, NaOH, NaHCO₃, KOH, K₂CO₃, and the like.

In similar manner, this product is then reacted with two or four moles of β-resorcylic acid or 5-amino salicylic acid. The reaction is preferably carried out at a temperature of about 0° to 20° C. and in alkaline medium, i.e. pH of about 8–11. It is usually necessary to heat the reaction to about 70–100° C. in order to complete the condensation in the case where four moles of the β-resorcylic acid or 5-amino salicylic acid is used. In the case that only two moles of β-resorcylic acid or 5-amino salicylic acid is employed, two moles of the compound

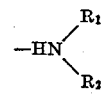

or 2 more moles of β-resorcylic acid or 5-amino salicylic acid, where $R_1$ and $R_2$ have the same values as given above, are added to the reaction mix. This second condensation is also carried out in alkaline medium, pH 8–11, but heating to 70–100° C. is usually necessary in order to complete the condensation. If in this reaction an organic solvent is present, it is then distilled off. The charge is then acidified by the addition of a mineral acid (e.g. HCl, H₂SO₄, etc.) allowed to precipitate, filtered and dried.

To convert this product into the metal salt, the product is initially dissolved in water, made alkaline (pH 8–11) by addition of an inorganic base (e.g. NaOH, KOH, soda ash, Na₂CO₃, NaHCO₃, etc.) and treated with a water soluble cupric or zinc salt. The amount of salt employed is dependent on the desired product. About two moles of metal salt effectively metallize the two salicylic acid moieties in the case when only two salicylic acid radicals are present in the molecule; or approximately four moles of metal salt are employed if the molecule contains four salicylic acid moieties. The amount of metal salt is always adjusted in such a way that two free sodium or potassium sulfonate or carboxylate substituents are present in the molecule.

The above method describes the preparation of these compounds by reacting the

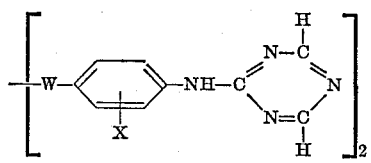

first with the V moiety and then with the Z moiety, and in the case where V and Z are identical, a one-step condensation. In the situation where V and Z are different, the Z moiety can be reacted first, followed by condensation of the resulting molecule with the V moiety. It is also possible to first react cyanuric chloride with the V and Z moieties followed by condensation with

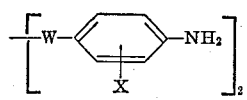

Accordingly, the present invention is intended to cover any of these alternative routes for preparation of the compounds.

The following compounds exemplify the intermediate which has the following formula:

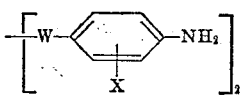

benzidine
2,2'-disulfobenzidine
3,3'-disulfobenzidine
benzidine-3,3'-dicarboxylic acid
4,4'-diaminostilbene
4,4'-diamino-2,2'-stilbenedisulfonic acid
4,4'diamino-3,3'-stilbenedisulfonic acid
4,4'-diamino-2,2'-stilbenedicarboxylic acid
4,4'-diamino-3,3'-stilbenedicarboxylic acid The following are representative of the intermediates for producing the Z moiety:

ammonia
methylamine
dimethylamine
ethylamine
diethylamine
propylamine
diisopropylamine
butylamine
di-tert-butylamine
ethanolamine
methylethanolamine
diethanolamine
2-hydroxypropylamine
3-hydroxypropylamine
glycine
taurine
morpholine
piperidine
β-resorcylic acid
5-aminosalicylic acid The following illustrate the water soluble metal salts which may be used:

cupric chloride
cupric chloride hydrate
cupric nitrate hydrate
cupric metaborate
cupric bromide
cupric sulfate hydrate
zinc borate
zinc bromide
zinc chlorate
zinc chloride
zinc fluosilicate
zinc iodide
zinc nitrate hydrate
zinc sulfate
zinc sulfate hydrate As pointed out above, the compounds of this invention have been found to be emiently suitable as biocidal agents and particularly useful as fungicides and bactericides. For application for the desired use the compound being soluble in water is preferably prepared for use by dissolving about .01 up to about 1.0 weight percent in water. Since the products are water soluble it is highly preferred that they be applied from a water solution. The compositions of this invention may be applied in known manner against the fungi and bacteria to be affected and have been found to provide better results than the analogous prior art compounds discussed above.

Example 1

In a 2-liter, 3-necked flask equipped with stirrer, thermometer and condenser is placed 250 gms. of ice. A solution of 37 gms. cyanuric chloride (0.2 mole) in 150 ml. acetone is then added. To this slurry is then added slowly with vigorous stirring a solution of 60 gms. 4,4'-diamino-2,2'-stilbenedisulfonic acid disodium salt (60.9% active) in 375 ml. water. 55 ml. 20% sodium carbonate (wt./vol.) is then added to keep the pH slightly red to brilliant yellow, the temperature being kept at 0–3° C. during at least one hour.

At the end of this time 31 gms. (0.2 mole) of B-resorcylic acid dissolved in 150 ml. water plus 30 ml. 40% sodium hydroxide (wt./vol.) are added at a temperture of 5–10° C. The slurry is then stirred for 10 hours at 20° C., 55 ml. 20% sodium carbonate are added in order to keep the solution basic to Brilliant Yellow paper. There is then added 92 gms. (0.22 mole) of N-methyltaurine (32.6%). The solution is heated at 70° C. for 8 hours, and during this time there is added 33 ml. sodium hydroxide (40% wt./vol.) to keep the solution pink to phenolphthalein paper. The acetone is distilled off. 20 ml. of conc. hydrochloric acid is added until delta yellow is obtained. The mixture is then stirred overnight at room temperature, filtered and dried.

15 grams of this product (0.02 mole) is then dissolved in 100 ml. of water and 7.8 ml. of soda ash (20%) added at 50° C. 5.0 gms. of cupric sulfate·5H$_2$O (0.02 mole) dissolved in 50 ml. water is added and the solution is heated to 65° C. and stirred for ½ hour. Thereafter 5 ml. of sodium hydroxide is added to obtain phenolphthalein pink. After stirring for 1 hour, the material is evaporated to dryness. The product has the formula:

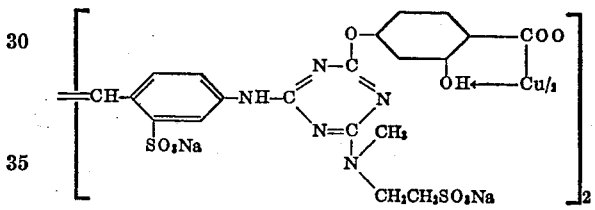

Application of this product: 0.1 gm. of this product is mixed with 2 ml. dimethylformamide, and this mixture at 70° C. is poured into 1 liter of water. The proper aliquot of this to give 25 p.p.m. in water is taken for dipping paper cloth according to AATCC test 6205. The test papers are 1½ inch squares of Whatman #2 filter paper.

A culture medium is made up consisting of:

| | Gms. |
|---|---|
| Ammonium nitrate | 3.0 |
| Potassium monohydrate orthophosphate | 2.5 |
| Magnesium sulfate·7H$_2$O | 2.0 |
| Agar | 20.0 |
| Distilled water up to 1000.0 gms. | |

The pH is adjusted to 6.4–6.8 and the solution is sterilized in an autoclave for 20 min. at 250° F. and 15 lbs. pressure, and then cooled.

Scrapings were then made from a Petri dish which had been inoculated with *Chaetomium globosum* and incubated for 10 days and stirred into a flask containing 100 ml. distilled water. The *Chaetomium globosum* is admixed with the culture medium employing a transfer loop.

Paper, which previously had been dipped into the solution of the product and dried, is then dipped into the inoculated agar medium, allowed to dry and maintained under sterile conditions at 80° F.

0.1 gram 8-hydroxyquinoline, copper salt is dissolved in 2 ml. dimethylformamide at 70° C., drowned into 1 liter of water, and the proper aliquot of this to give 25 p.p.m. in water is taken. Paper is dipped in this and dried, and then dipped into the inoculated agar medium, dried and maintained under sterile conditions at 80° F.

After 24, 48 and 72 hours, the paper treated with the product of this example showed less growth than the product treated with 8-hydroxyquinoline, copper salt. Paper treated with only the culture medium and no fungicide showed still greater growth than the papers treated with both the product of this example and 8-hydroxyquinoline, copper salt.

In an application of this product to cotton cloth, 0.1 gm. of the product is combined with 2 ml. dimethylformamide and this mixture at 70° C. is poured into 1 liter of water. The proper aliquot is taken and made up with 100 ml. of water and 8% of Tide detergent to give 0.1% O.W.F. of the product. 5 grams of cotton cloth are introduced and agitated in the bath for 10 min. at 120° F. The cloth is removed, rinsed and dried. It is cut into 1½ inch squares, treated with the culture medium prepared above and incubated for 24, 48 and 72 hours. The cloth treated with the product of the example showed less growth than when an equivalent amount was treated with 8-hydroxyquinoline, copper salt, and both showed much less growth than when the cloth was treated with the culture medium without being previously treated with fungicide.

Example 2

Preparation of the compound having the formula:

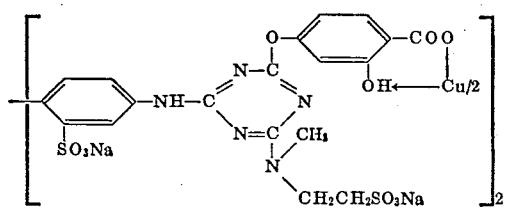

Example 1 is repeated with the exception that an equivalent amount of 4,4'-diamino-2,2'-diphenyldisulfonic acid is substituted for the 4,4'-diamino-2,2'-stilbenedisulfonic acid.

Application to paper and cotton material, made according to the manner of Example 1, gave commensurate results.

Example 3

Example 1 is repeated with the exception that an equivalent amount of zinc chloride is substituted for the cupric sulfate·5H$_2$O employed in Example 1.

Application to paper and cotton material, made according to the manner of Example 1, gave commensurate results.

Example 4

Preparation of the compound having the formula:

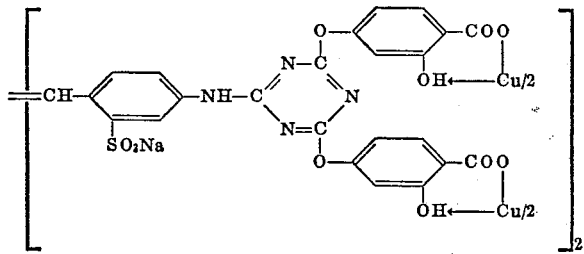

This product is produced in a manner similar to that of Example 1 in that the 4,4'-diamino-2,2'-stilbenedisulfonic acid and cyanuric acid are condensed in the manner given, the initial β-resorcylic acid is condensed, followed by addition of an additional 0.22 mole resorcylic acid whereupon the acetone is evaporated off and the remaining solution is heated 10 hours at 95° C., acidified with hydrochloric acid, stirred overnight at room temperature, filtered and dried.

The product is metallized as in Example 1 except that twice the amount of cupric chloride·5H$_2$O is employed.

Application to paper and cotton material, made according to the method of Example 1, gave commensurate results.

Example 5

Preparation of the compound having the formula:

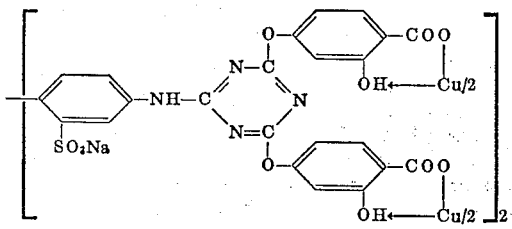

is prepared in the same manner as Example 4 with the exception that the 4,4'-diamino-2,2'-stilbenedisulfonic acid is substituted by an equivalent amount of 4,4'-diamino-2,2'-diphenyldisulfonic acid.

Application of this product to paper and cotton material, made according to the method of Example 1, gave commensurate results.

Example 6

Preparation of the compound having the formula:

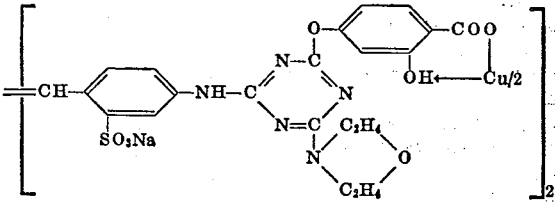

This product is prepared in the same manner as in Example 1 with the exception that the methyltaurine is substituted by an equimolar amount of morpholine.

Application of this product to paper and cotton material, made according to the method of Example 1, gave commensurate results.

Example 7

Preparation of the compound having the formula:

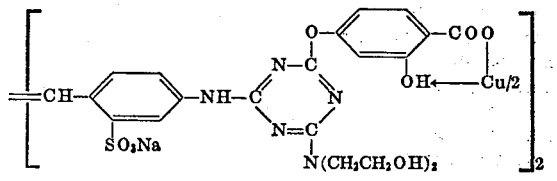

The product is prepared in the manner of Example 1 with the exception that an equivalent amount of diethanolamine is substituted for the N-methyltaurine.

Application of this product to paper and cotton material, made according to the method of Example 1, gave commensurate results.

Example 8

Preparation of the compound having the formula:

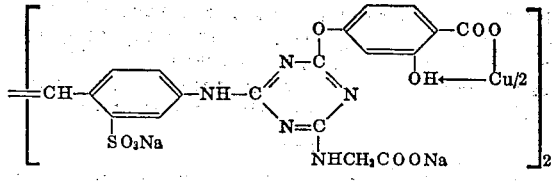

The product is prepared in the manner of Example 1 with the exception that an equivalent amount of glycine is substituted for the N-methyltaurine.

Application of this product to paper and cotton material, made according to the method of Example 1, gave commensurate results.

Example 9

Preparation of the compound having the formula:

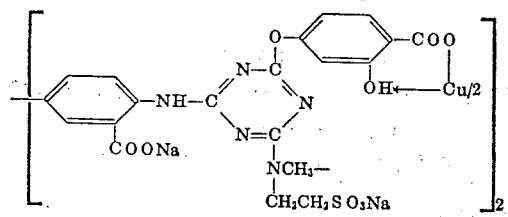

This product is prepared in the manner of Example 1, with the exception that an equivalent amount of 3,3'-benzidine-dicarboxylic acid is substituted for the 4,4'-diamino-2,2'-stilbenedisulfonic acid.

Application of this product to paper and cotton material, made according to the manner of Example 1, gave commensurate results.

Example 10

Preparation of the compound having the formula:

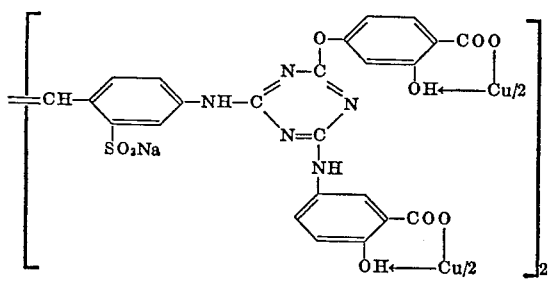

This unmetallized product is made in the manner of Example 1 with the exception that an equivalent amount of 5-aminosalicylic acid is used to replace the N-methyltaurine.

The product was then metallized as in Example 1, using twice the molecular proportion of cupric sulfate·5H$_2$O.

Application of this product to paper and cotton material, made according to the manner of Example 1, gave commensurate results.

Example 11

Preparation of the compound having the formula:

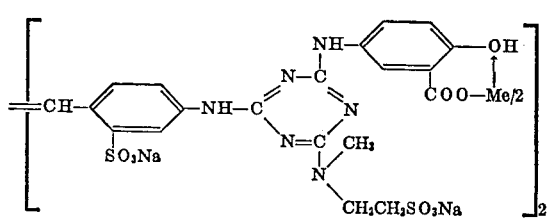

Example 1 is repeated with the exception that the β-resorcylic acid is substituted by an equivalent amount of 5-aminosalicylic acid. The product has fungicidal and bactericidal properties.

The invention has been described herein by reference to certain preferred embodiments. However, as obvious variations thereon will become apparent to those skilled in the art, it is not to be considered as limited thereto.

What is claimed is:

1. A compound of the following structural formula:

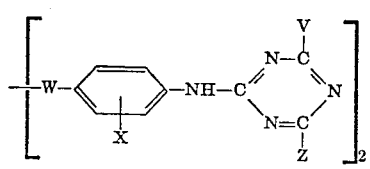

wherein W is a monovalent bond or —CH=CH—; X is hydrogen, —COOR, —SO$_3$R, —COOMe/2 or —SO$_3$Me/2

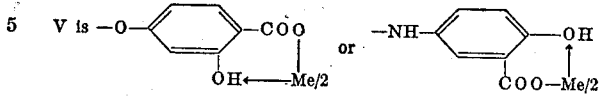

V is

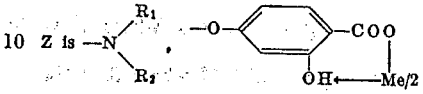

Z is

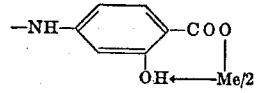

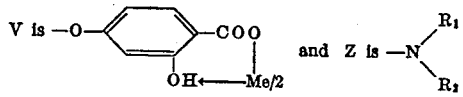

wherein R is an alkali metal such as K or Na; R$_1$ is hydrogen, lower alkyl or hydroxy lower alkyl; R$_2$ is hydrogen, lower alkyl, hydroxy lower alkyl, or alkylene-COOR, -alkylene-SO$_3$R, -alkylene-COOMe/2 or -alkylene-SO$_3$Me/2;

Me is Cu$^{++}$ or Zn$^{++}$; and at least one of X and Z has a free water solubilizing sulfonic or carboxylic acid group.

2. A compound according to claim 1 wherein W is —CH=CH—, X is SO$_3$R,

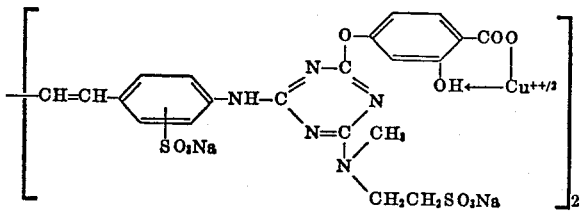

where R, Me, R$_1$ and R$_2$ are as defined in claim 1.

3. A compound of the following structural formula:

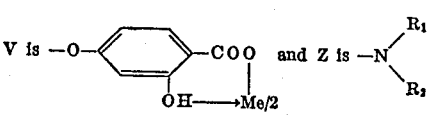

4. A compound according to claim 1 where W is a monovalent bond, X is SO$_3$R,

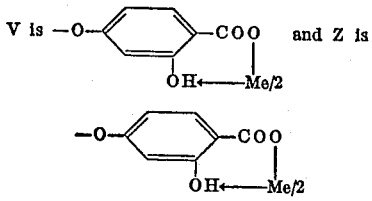

where R, Me, R$_1$ and R$_2$ are described in claim 1.

5. A compound according to claim 4 wherein R is Na, Me is Cu$^{++}$, R$_1$ is CH$_3$ and R$_2$ is —CH$_2$CH$_2$SO$_3$Na.

6. A compound according to claim 2 wherein Me is Zn$^{++}$.

7. A compound according to claim 1 wherein W is —CH=CH—; X is SO$_3$R,

V is —O—⬡—COO   and Z is

|
         OH←——Me/2

—O—⬡—COO
       |
       OH←——Me/2 where R and Me are as described above.

8. A compound according to claim 7 wherein R is Na and Me is Cu$^{++}$.

9. A compound according to claim 1 wherein W is a monovalent single bond, X is SO$_3$R and V and Z are 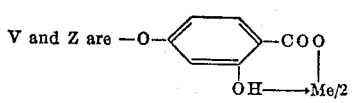

where R and Me are as described above.

10. A compound according to claim 9 where R is Na and Me is Cu++.

11. A compound according to claim 2 where

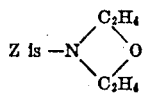

R is Na and Me is Cu++.

12. A compound according to claim 2 where Z is —N(CH₂CH₂OH)₂.

13. A compound according to claim 12 where R is Na and Me is Cu++.

14. A compound according to claim 2 where Z is —NHCH₂COONa and Me is Cu++.

15. A compound according to claim 1 wherein W is a monovalent bond, X is COOR,

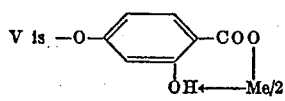

and Z is 
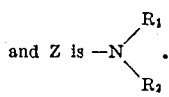

16. A compound according to claim 15 where R is Na, Me is Cu++, R₁ is CH₃ and R₂ is —CH₂CH₂SO₃Na.

References Cited
FOREIGN PATENTS
1,116,007  1/1956  France _____ 260—240 B

OTHER REFERENCES
Chemical Abstracts, vol. 42, cols. 4354 to 4358 (1948) (abst. of British Pat. 595,181).

Sato et al.: Gann 1970, pp. 569–582 (relied upon as abstracted in Chemical Abstracts vol. 74, abst. 74833y (1971) pending obtention of original article).

JOHN D. RANDOLPH, Primary Examiner

U.S. Cl. X.R.
424—249; 260—242